(12) United States Patent
Smereka et al.

(10) Patent No.: US 9,443,425 B2
(45) Date of Patent: Sep. 13, 2016

(54) METHODS AND SYSTEMS FOR DESTINATION CONGESTION AVOIDANCE

(71) Applicant: MYINE ELECTRONICS, INC., Ferndale, MI (US)

(72) Inventors: Scott Smereka, Warren, MI (US); Joey Ray Grover, Madison Heights, MI (US)

(73) Assignee: Myine Electronics, Inc., Ferndale, MI (US)

( * ) Notice: Subject to any disclaimer, the term of this patent is extended or adjusted under 35 U.S.C. 154(b) by 5 days.

(21) Appl. No.: 14/534,785

(22) Filed: Nov. 6, 2014

(65) Prior Publication Data

US 2016/0133127 A1    May 12, 2016

(51) Int. Cl.
*G01C 21/26* (2006.01)
*G08G 1/01* (2006.01)

(52) U.S. Cl.
CPC ............. *G08G 1/0125* (2013.01); *G01C 21/26* (2013.01)

(58) Field of Classification Search
CPC .............................. G01C 21/26; G08G 1/0125
See application file for complete search history.

(56) References Cited

U.S. PATENT DOCUMENTS

| | | | |
|---|---|---|---|
| 8,611,929 B1 | 12/2013 | Vandehey et al. | |
| 2004/0034464 A1* | 2/2004 | Yoshikawa | G08G 1/096716 701/117 |
| 2005/0096839 A1* | 5/2005 | Nakano | G08G 1/0969 701/532 |
| 2005/0131631 A1* | 6/2005 | Nakano | G01C 21/3492 701/532 |
| 2005/0143903 A1* | 6/2005 | Park | G08G 1/01 701/117 |
| 2006/0004511 A1* | 1/2006 | Yoshikawa | G01C 21/3492 701/532 |
| 2006/0200303 A1* | 9/2006 | Fuentes | G01C 21/3492 701/532 |
| 2008/0077324 A1* | 3/2008 | Hatano | G01C 21/367 701/455 |
| 2011/0231354 A1* | 9/2011 | O'Sullivan | G08G 1/0104 706/46 |
| 2012/0191290 A1* | 7/2012 | Bourque | G06Q 10/047 701/29.1 |
| 2013/0041574 A1* | 2/2013 | Koshizen | G08G 1/0112 701/118 |
| 2013/0218445 A1* | 8/2013 | Basir | G08G 1/00 701/117 |
| 2014/0122483 A1 | 5/2014 | Zhang et al. | |
| 2014/0163934 A1 | 6/2014 | Zhang et al. | |
| 2014/0222320 A1* | 8/2014 | Lyuh | G01C 21/3492 701/117 |
| 2015/0179062 A1* | 6/2015 | Ralston | G01C 21/26 701/117 |
| 2015/0365183 A1* | 12/2015 | Kim | H04H 20/55 375/296 |
| 2016/0004915 A1* | 1/2016 | Chen | G06K 9/00791 348/149 |

* cited by examiner

*Primary Examiner* — Rodney Butler
(74) *Attorney, Agent, or Firm* — Jennifer M. Stec; Brooks Kushman P.C.

(57) ABSTRACT

A remote server having at least one processor in communication with one or more databases is configured to predict a congestion of a destination based on traffic information and/or an estimated amount of people at the destination. The one or more databases may include map information and attendance information. The processor is configured to receive a current location and destination input. The processor may be further configured to query the map information for one or more coordinates for the destination within a predefined distance to the current location. The processor may be further configured to query the attendance information to estimate the number of people at the destination based on the one or more coordinates and compare the estimated number of people to one or more predefined congestion values for the destination. The processor may be further configured to output a congestion prediction for the destination based on the comparison.

9 Claims, 6 Drawing Sheets

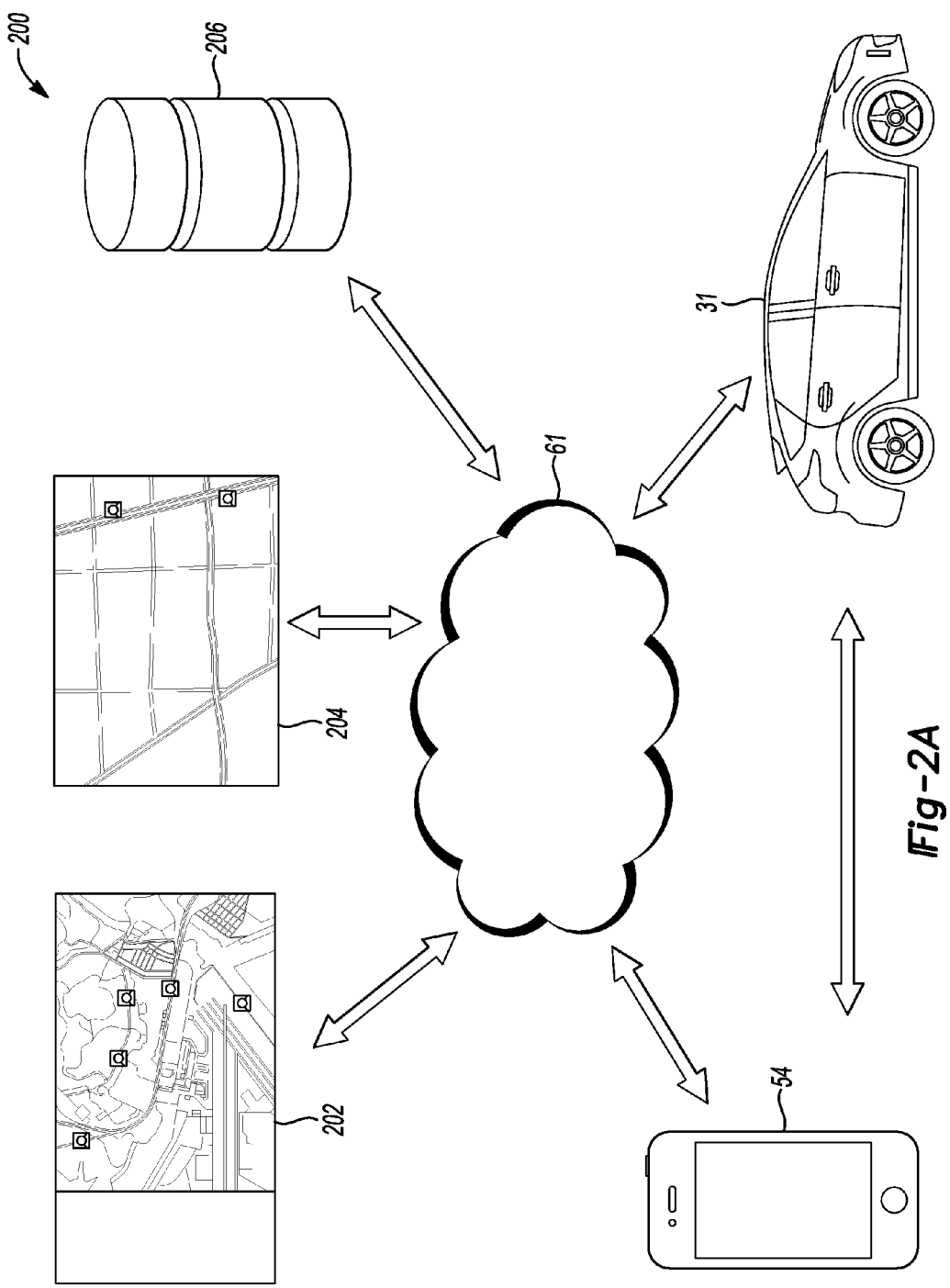

METHODS AND SYSTEMS FOR DESTINATION CONGESTION AVOIDANCE

TECHNICAL FIELD

The present disclosure relates to a system and method for predicting congestion at a destination, more particularly, a congestion prediction system arrangement and methodology.

BACKGROUND

A vehicle navigation system may allow a driver of the vehicle to set a destination. A current position detector may detect a current position of the vehicle. Thus, the destination and the current position of the vehicle may be set. A route from the current position to the destination may then be searched for. Route navigation/guidance may be performed along the route detected in the searching process. In the route searching process, a route that is the shortest in distance from the current position to the destination or a route that is the shortest in time needed to reach the destination is selected.

The vehicle navigation system may receive traffic information, such as, road congestion information, so that a suitable route may be searched to avoid a congested area. An area including the route is logically divided by operation of a grid square system into sections. A server searches for a plurality of routes and distributes traffic information to the navigation system regarding each section. Thus, the navigation system searches for a route that is shortest in necessary time after receiving the traffic information.

SUMMARY

In at least one embodiment, a remote server comprising at least one processor in communication with one or more databases. The one or more databases may include map information and attendance information. The processor is configured to receive a current location and destination input. The processor may be further configured to query the map information for one or more coordinates for the destination within a predefined distance to the current location. The processor may be further configured to query the attendance information to estimate the number of people at the destination based on the one or more coordinates and compare the estimated number of people to one or more predefined congestion values for the destination. The processor may be further configured to output a congestion prediction for the destination based on the comparison.

In at least one embodiment, a vehicle computing system comprising at least one processor in communication with a transmitter. The processor is configured to receive a current location and destination input. The processor may be further configured to query a database having map information for one or more coordinates for the destination. The processor may be further configured to transmit a traffic information request for the one or more coordinates to a remote server via the transmitter. The processor may be further configured to receive traffic information from the remote server for the destination and calculate an arrival time from the current location to the destination based on the traffic information. The processor may be further configured to output a congestive prediction for the destination based on the arrival time.

In at least one embodiment, a method to output a congestion prediction in response to a destination input. The method using a processor communicating with one or more databases having map information and attendance information. The method may query the map information for a location based on the destination. The method may query the attendance information to estimate a number of people at the location. The method may output a congestion prediction for the location based on comparing the number of people at the location to a predefined congestion value.

BRIEF DESCRIPTION OF THE DRAWINGS

FIG. 2A is an illustrative example of a congestion prediction system in communication with the vehicle-based computing system;

DETAILED DESCRIPTION

Figure 1:
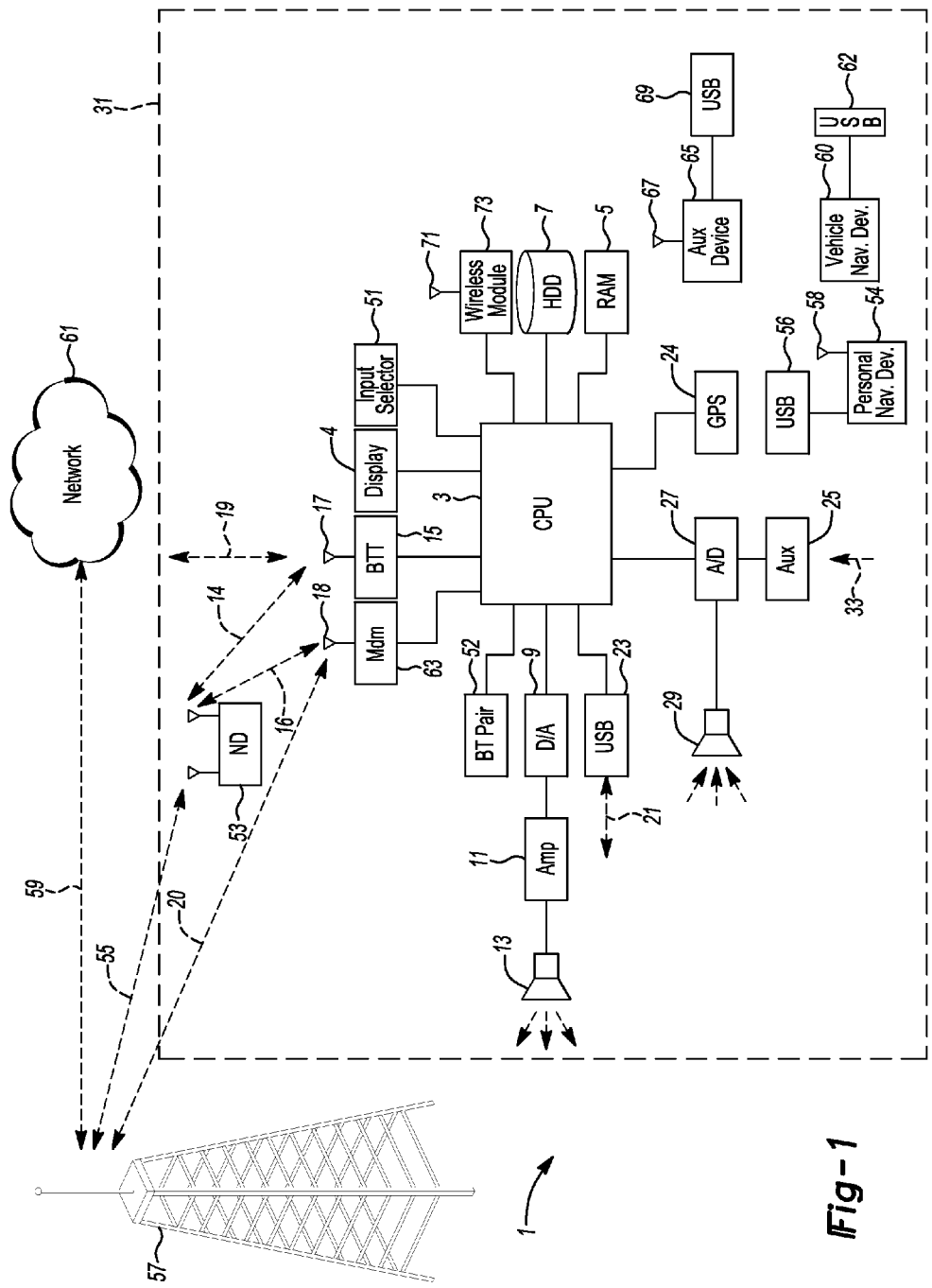
FIG. 1 is an example block topology for a vehicle-based computing system for a vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

This disclosure relates to a system and method for predicting congestion at a selected destination (e.g., location). The system and method may predict congestion for a selected location based on one or more algorithms computing information received from one or more database including social media data, traffic data (e.g., construction, reported accident, etc.), and stored historical data related to the location. The historical data may include data related to a particular location, peak hours of traffic for the location, and how many people have been at the location at a certain given time in the past.

For example, a user may select a given destination via a navigation system, and based on the selection the system may query social media feeds and/or a database to predict the number of people at that destination (e.g., location check-in posts via Facebook). The system may query one or more locations around the destination to predict an amount of congestion. The system may also suggest other alternative locations related to the selected location in response to an unfavorable congestion calculation result.

The disclosure may utilize a vehicle computing system configured to communicate with a remote server to predict how many people are at a selected location. The server may predict how many people are at a particular location and/or a surrounding area of the location. The server may also be configured to include ancillary data found from other sources which may comprise the location's operating hours, size of building, and number of parking spaces at the location. In another example, the user may enter a restaurant name and the system may predict how busy the restaurant is based on social media feeds, traffic data, and/or historical information of the restaurant (e.g., the average number of customers for that particular time and day). The system may output data to notify the user if the restaurant is busy, average, or empty. The system may also suggest other options similar to the restaurant or other locations for the restaurant based on unfavorable congestion results for the initial selection.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof). For example, the VCS 1 may be in communication with a navigation system via the vehicle network. The navigation system may comprise one or more user screens to enable a driver to enter a destination. The navigation system may include the GPS input 24, a vehicle navigation device 60, a personal navigation device 54, and/or a combination thereof. The VCS 1 may receive the destination information from a user via the navigation system. The VCS may query one or more coordinates via the navigation system. The one or more coordinates may include one or more locations for the destination. The VCS may request for a congestion prediction for the destination using the one or more coordinates.

Outputs to the system may include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such the vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

FIG. 2A is an illustrative example of a congestion prediction system 200 in communication with the vehicle-based computing system 1. The congestion prediction system 200 may comprise a network 61 having at least one server, a database 206, and hardware configured to execute one or more algorithms to calculate a congestion prediction for a destination. The server 61 may be in communication with one or more databases for retrieving information related to a particular location. The one or more databases may include, but is not limited to, social media data 202, traffic data 204, and/or a combination thereof. For example, the social media data 202 may include data stored at a database and/or from a web page having one or more computers that are associated with a fully qualified domain name and make content available on the web such as Facebook™, Foursquare™, Gowalla™, etc. The congestion prediction system 200 may retrieve information from one or more social media databases based on the destination input.

In another example, a user may request a destination of a particular coffee shop using the display 4 of the VCS 1. The congestion predication system 200 may receive the coffee shop destination and search social media data 202 based on the coffee shop destination. For example, Facebook™ allows people to use the GPS on their mobile phones to let friends know exactly where they are located. The congestion predication system 200 may request data based on the coffee shop destination to predict how many people are at the coffee shop or nearby.

The traffic data 204 may include data from a database having traffic information and/or a web page having one or more computers that are associated with a fully qualified domain name and make content available on the web such as HERE™, Beat the Traffic™, and/or any other local news traffic data. The congestion prediction system 200 may request information from one or more traffic databases based on the destination input.

Continuing from the coffee shop example, the congestion prediction system may determine the GPS location (e.g., one or more coordinates) for the coffee shop and request traffic information from the traffic website database 204. For example, HERE™ allows traffic information based on a destination to be communicated to their users. The congestion predication system 200 may request traffic data based on the coffee shop destination to predict how congested the area surrounding the coffee shop.

The server 61 may retrieve additional data that is stored at the database 206. The database 206 may include historical data related to a destination. For example, the additional data related to the coffee shop may include information of how many people on average are usually at the destination based on a date, day of the week, time, and/or a combination thereof.

In another example, a user of the vehicle 31 may enter a destination (e.g., coffee shop destination) at the display 4 of the VCS 1. The VCS 1 may receive the destination information and transmit a request for congestive predication of that destination to the network 61. The VCS 1 may transmit this request to the network using a wireless connection via a communication device. The communication device may include, but is not limited to, an embedded cellular phone in the vehicle 31, an embedded modem in the vehicle 31, a nomadic device 53 in communication with the VCS 1 using a Bluetooth transmitter, and/or a combination thereof.

In one example, the user of the vehicle 31 may enter a destination at a nomadic device 54 via an application associated with the VCS 1. The VCS 1 may receive the destination from the nomadic device 54 via a wired and/or a wireless technology connection. The VCS 1 may receive the destination information from the nomadic device 54 and transmit the congestive request for the destination to the network 61.

Figure 2B:
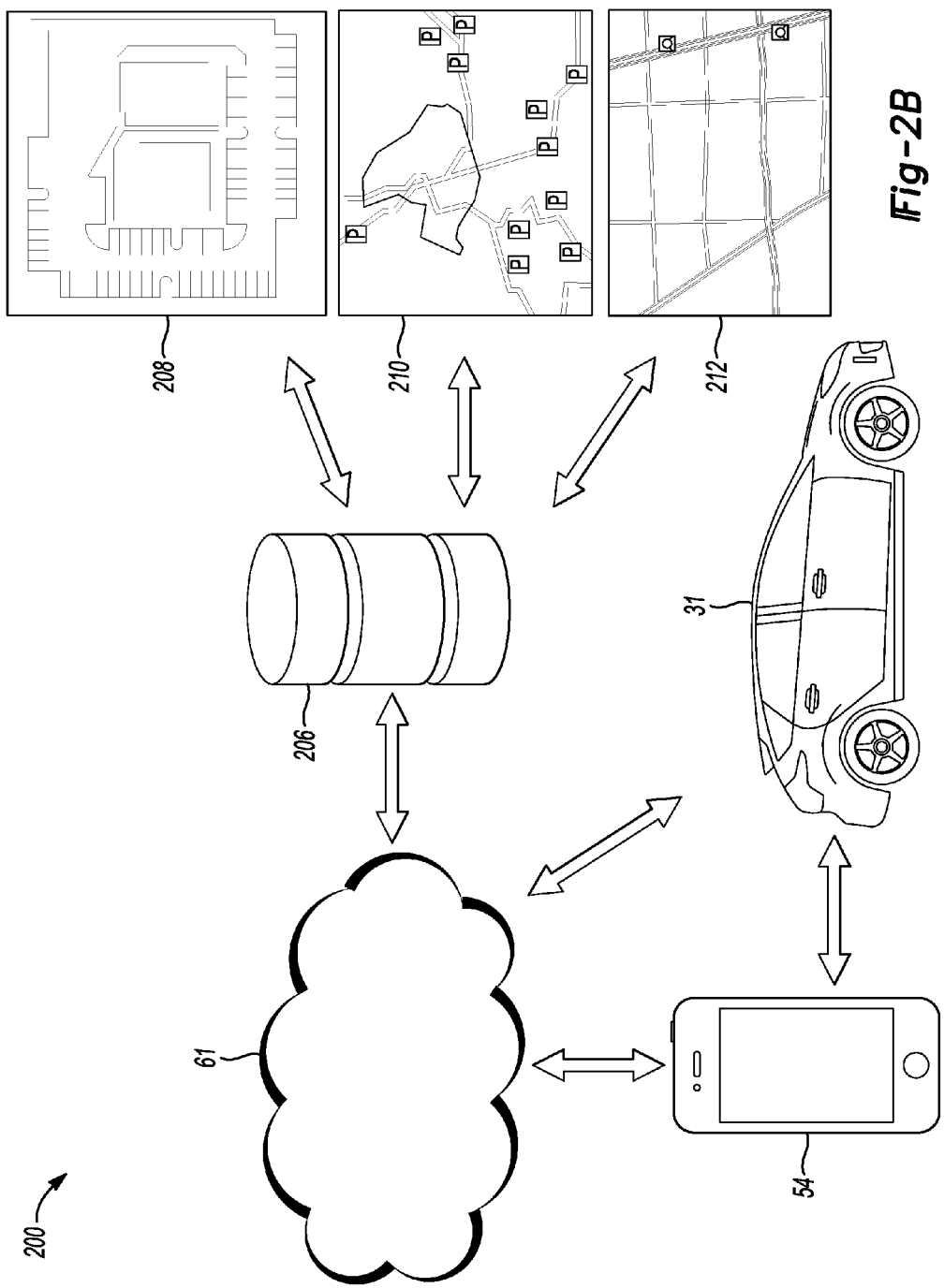
FIG. 2B is an illustrative example of the congestion prediction system comprising a database for one or more locations.

FIG. 2B is an illustrative example of the congestion prediction system 200 comprising a database 206 for one or more locations. The congestion prediction system 200 may communicate with a database 206 to determine the congestive predication. The database 206 may include, but is not limited to, destination parking lot information 208, parking surrounding the location 210, historical check-in data, historical traffic logs 212, and/or a combination thereof.

For example, the user may enter a destination at the nomadic device 54 using a congestive prediction application (not shown). The entered destination at the congestive prediction application may be communicated to the VCS 1 via an application program interface (API). The VCS 1 may transmit a request to calculate a congestive prediction based on the entered destination. In another example, the nomadic device 54 may receive the destination information via the congestive prediction application and transmit the request for a congestive prediction to the network 61. The network may transmit the congestive prediction for the destination to the nomadic device 54 and/or the VCS 1 at the vehicle 31.

The congestive prediction system 200 may receive the destination information and communicate with a database 206 to retrieve historical data including statistical information related to the destination. The congestive prediction system 200 may query the database 206 based on the destination location to determine the available parking locations 208 around the destination. The system 200 may predict if there is an acceptable number of parking locations available based on a comparison of the estimated number of people expected to be at the destination to the parking lot information for the destination.

For example, the congestive prediction system 200 may receive a restaurant location from a user. The system 200 may estimate the number of people at the restaurant based on at least one of a query of a social media site database(s), historical data for the restaurant, traffic information database, and/or a combination thereof. The system 200 may predict if there is an acceptable amount of parking spots located at and/or around the restaurant based on the estimated number of people at the restaurant and the number of parking locations available for the restaurant.

In another example, if a query of the social media data and/or traffic information is insufficient to make a reliable prediction, the congestive prediction system 200 may include historical data to make a congestive prediction. For example, the congestive prediction system 200 may retrieve the social media data and the traffic information and compare it to the historical data related to previous check-ins for the restaurant and the traffic data related to the time of day, day of the week, etc. The congestive prediction system 200 may update the database 206 with the in progress query of the social media data and/or traffic information.

Figure 3:
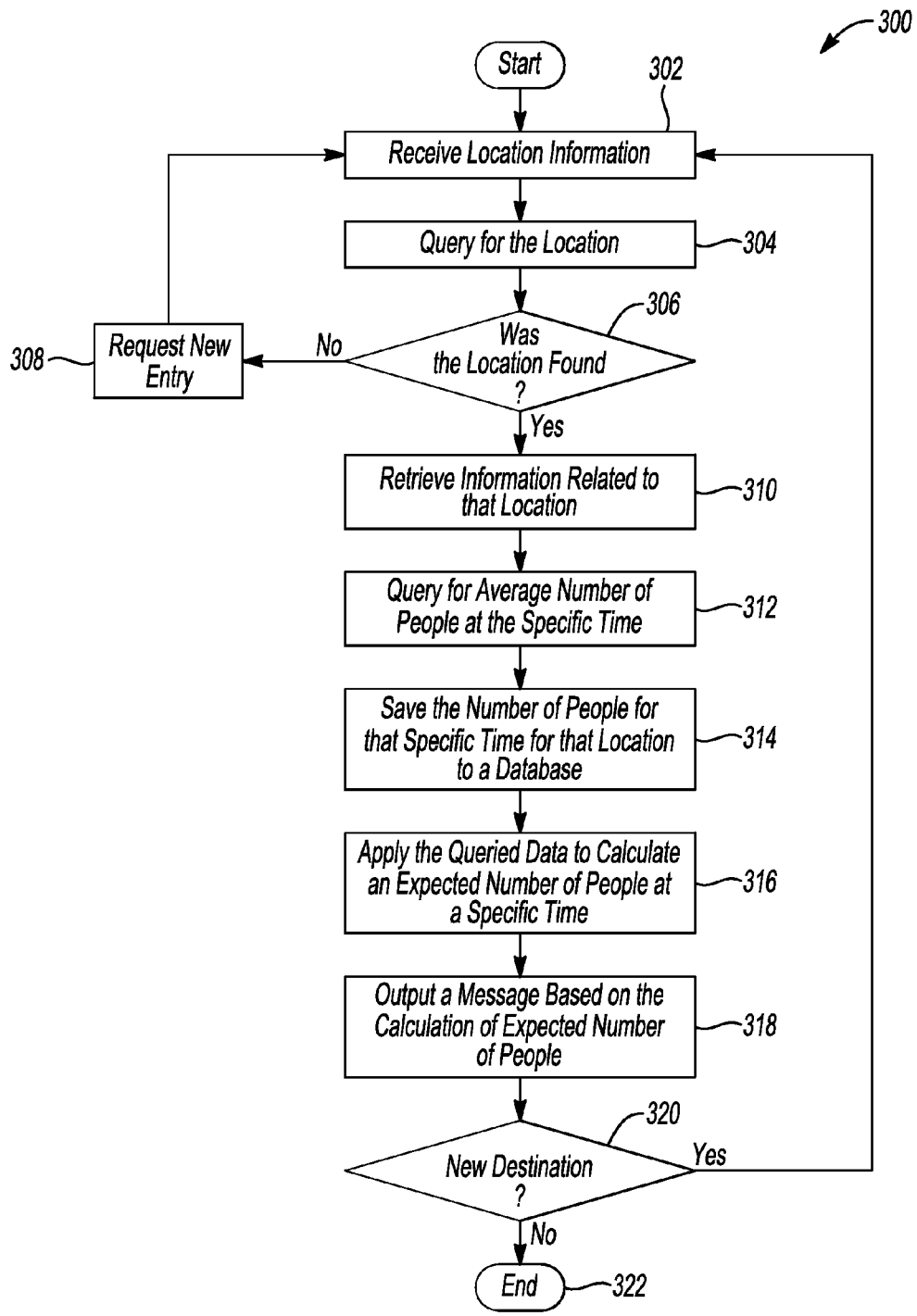
FIG. 3 is an illustrative flowchart of an expected number of people calculation for the congestion prediction system.

FIG. 3 is an illustrative flowchart of an expected number of people calculation method 300 for the congestion prediction method and system. The congestive prediction method may comprise of one or more software applications that are executed on hardware at the vehicle computing system. The one or more applications may include instructions to populate and manage congestive prediction data for a congestive prediction system. The expected number of people calculation method 300 may be implemented using software code contained within the VCS. In other embodiments, the method 300 may be implemented in other vehicle controllers, at a remote server in communication with the VCS, distributed amongst multiple vehicle controllers, or a combination thereof.

Referring again to FIG. 3, the vehicle and its components illustrated in FIG. 1, FIG. 2A and FIG. 2B are referenced throughout the discussion of the method 300 to facilitate understanding of various aspects of the present disclosure. The method 300 of predicting a congestion at and/or surrounding a destination may be implemented through a computer algorithm, machine executable code, or software instructions programmed into a suitable programmable logic device(s) of the vehicle, such as the vehicle control module, a control module at the remote server, another controller in communication with the vehicle computing system, or a combination thereof. Although the various operations shown in the flowchart diagram 300 appear to occur in a chronological sequence, at least some of the operations may occur in a different order, and some operations may be performed concurrently or not at all.

In operation 302, the method 300 may receive location information from one or more devices. The one or more devices may comprise hardware to execute the congestion prediction application. The one or more devices may be configured to communicate with the server 61. The one or more devices may include a nomadic device 54, a VCS 1, and/or a combination thereof. The location information may include, but is not limited to, a business name, point of interest, GPS coordinate, street name, latitude and longitude coordinates, and/or a combination thereof.

For example, a user may enter in McDonalds as the location information. The device executing the congestion prediction application may have a GPS system. The congestive prediction application may retrieve GPS coordinates from the GPS system to determine coordinates where the location information was entered. The congestive prediction application may retrieve the closest McDonalds located near the coordinates. The congestive prediction application may transmit the location information and/or the GPS data to the congestion prediction system to retrieve data related to the location information.

In another example, the congestive prediction application may retrieve two or more McDonalds located near the current location of the user. The method may provide coordinates for the two or more McDonalds located near the current location. The congestive predication application may transmit the two or more McDonalds coordinates to the system to retrieve the related location information.

In operation 304, the method 300 may query for data based on the location information. Continuing from the McDonalds example, the method 300 may receive GPS data related to the device location and determine a McDonalds closest to the device.

In operation 306, the method 300 may determine if the location is found based on the location information. The method 300 may also require that the location be found based on one or more predefined criteria requirements. The one or more predefined criteria requirements may include a range in miles around the device's origin where the user is willing to travel to the location, a travel time threshold, and/or a combination thereof. If the location is not found, the method 300 may request a new location entry at the device in operation 308. For example, if a McDonalds restaurant is not located within a predetermined range in miles around the device's origin, the method 300 may request a new location entry.

In operation 310, the method may retrieve information related to the location. The congestion prediction system and method may query information from a social media database based on the location to determine how many people are currently "checked-in" at the location. For example, if the McDonalds location is found, the method 300 may query a Facebook database to predict how many people are currently at the location. In another example, the method 300 may query traffic websites to predict the amount of traffic congestion around the location.

The method 300 may also retrieve information related to the location from a historical database. The database may store historical information related to the location and/or the surrounding area of the location. For example, the method 300 may query the database to search for the number of people that are usually checked-in at the location based on the time of day, day of the week, week of the year, and/or a combination thereof. In another example, the method 300 may query the database to search for a traffic volume estimate around the location based on at least one of the time of day, day of the week, and week of the year.

In operation 312, the method 300 may query for an average number of people at the specific time based on information received from the social media database, historical data saved at the database, traffic information, and/or a combination thereof. The method 300 may update the data stored for the location at the database by saving the retrieved data related to the number of people at the specific time to the database in operation 314.

For example, the method 300 may retrieve information based on the location from a social media database. The method 300 may estimate how many people may be at the location based on the retrieved information. The method 300 may update the database to reflect the estimated number for the particular location, time of day, day of the week, and month of the year. The database may update and save data to provide a larger sample of data points to improve the accuracy of the congestive prediction calculation.

In operation 316, the method 300 may apply the queried data to calculate an expected number of people at a specified time. For example, a controller may receive the queried data from one or more servers and calculate the number of people based on a predefined window of time. For example, if the method 300 receives a count of ten people that have checked-in at the McDonalds via Foursquare, the method may look to see if the ten people have checked-in with the last twenty-five minutes. The method 300 may also look at the average number of people that are usually at the McDonalds based on the date, time, etc., and apply the average number stored at the database to the retrieved number count from one or more databases to improve the congestion predication accuracy.

In operation 318, the method 300 may output a message based on the calculation of an expected number of people at one or more devices. For example, the method 300 may output a congestive predicted grading level of high congestion, moderate congestion, and low congestion. Where high congestion may be interpreted as being crowed, increase wait times, longer lines, and/or limited parking. Where moderate congestion may be interpreted as a potential of being crowed at the location, and/or the likelihood of an increase wait time for service. Where low congestion may be interpreted as available parking, no traffic, and/or the potential of fast service.

In another example, the method 300 may provide a scale of green, yellow, and red. Where red means the location and/or surrounding area is congested, yellow means moderate congestion, and green means acceptable levels of congestion. For example, the method may set the red indication based on an indication that a car accident is near the location causing traffic.

In operation 320, the method 300 may enable the user to enter in a new destination. If the user enters a new destination, the method 300 may proceed with the process of querying for the location and calculating a congestion prediction based on the location in operation 302 through 318.

In operation 322, the VCS 1 may monitor for a key off event. If a key off event is not detected, the VCS 1 may continue to monitor for a new destination. If a key off event is detected, the VCS 1 may begin to power down storing one or more congestive prediction messages in non-volatile memory while disabling one or more systems. In another embodiment, the VCS 1 may transmit one or more messages containing congestion prediction data to a connected nomadic device when a key-off event is detected.

Figure 4:
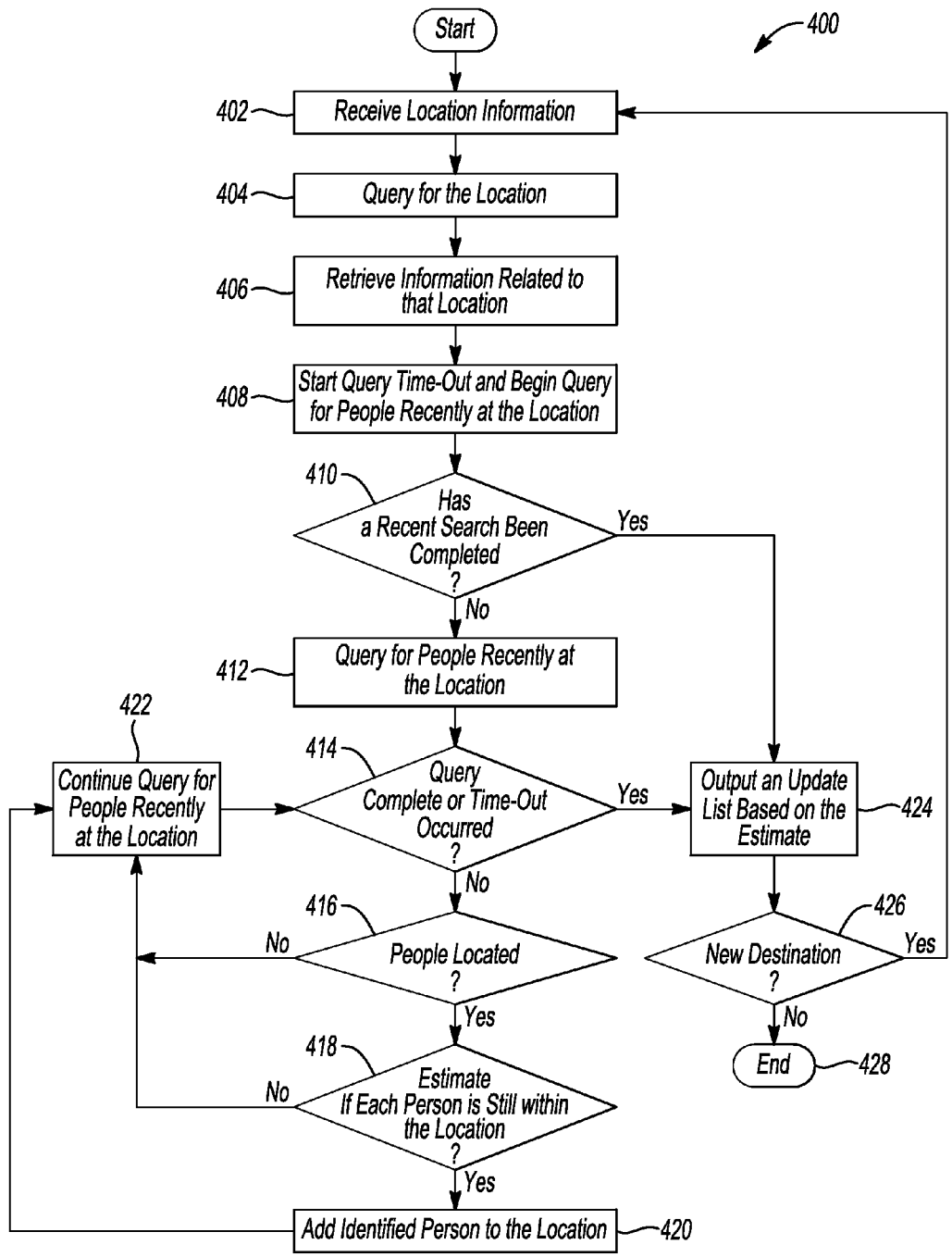
FIG. 4 is an illustrative flowchart of a data collection method for the congestion prediction system.

FIG. 4 is an illustrative flowchart of a data collection method 400 for the congestion prediction system. The data collection method may comprise of one or more software applications that are executed on hardware at the VCS, at a remote server in communication with the VCS, at a nomadic device in communication with the VCS and/or remote server, and/or a combination thereof. The one or more applications may include instructions to collect data for the congestion prediction method.

In operation 402, the method 400 may receive location information at one or more controllers from the VCS 1, nomadic device 54, and/or a combination thereof. The method 400 may query for the location information at one or more servers in operation 404. For example, the location information may be a department store such as Target Corporation (Target). The method may query information related to the Target location closest to the user. In another embodiment, the user may select the Target location based on a list of one or more Target locations closest to the user so that the method may query information related to the specific location.

In operation 406, the method 400 may retrieve the information related to that location. For example, the method 400 may retrieve data from one or more servers related to the Target location including, but not limited to, traffic information, store operating hours, number of people "check-in", etc.

In operation 408, the method 400 may initiate a predefined query timeout counter and begin to query for people at the location. The predefined query time counter may monitor the amount of time for the method 400 to search for one or more people at the location. Once the query has begun, the method 400 may determine if a recent search has already been completed for the location in operation 410. If a recent search has already been completed for the location, the method 400 may output an update list based on the estimated number of people at the location in operation 424.

In operation 412, the method 400 may query for an amount of people that are at the location. For example, the method 400 may query the information to predict an estimate of how many people may be at and/or around the Target store. The estimate may be based on several factors including, but not limited to, social media feeds, social media databases, historical information databases, and/or traffic information.

In operation 414, the method 400 may determine if the query is complete and/or if a period of time has exceeded the predefined query time counter. If the query is complete, the method 400 may output the update list based on the estimated number of people at the location in operation 424. If the period of time has exceeded the predefined query time counter, the method 400 may output the update list based on the estimated number of people at the location in operation 424.

In operation 416, the method 400 may predict if one or more people are located at the location. For example, the method may retrieve information that states a person has checked-in at the Target store. If a person is not discovered at the location, the method may continue to query for people recently at the location in operation 422.

In operation 418, the method 400 may further analyze the location information for each person found to determine if the person is still at the location. For example, the person may have checked-in sixty minutes ago, and may not be at the location. Using the McDonalds example above, if the person checked-in sixty minutes earlier, it may be safe to assume they are no longer at the fast food restaurant. If the person checked-in at the Target store sixty minutes earlier, they may still be at the location. The method 400 may determine if a person is still within the area of the location based on one or more predefined threshold variables. The one or more predefined threshold variables may be several factors including the type of business (e.g., restaurant, retail, movie theater, etc.) of the location to determine whether or not a person may still be at the location. If the method determines that the person is no longer in the area and/or at the location, the method 400 may continue to query for people recently at the location in operation 422.

In operation 420, if the method 400 determines that the person is still within the area of the location, the method may identify the person as being at the location. Once the method 400 determines that the person is within the area of the location, the method may continue to query for additional people at the location in operation 422. For example, the person is recognized as being at the location based on the one or more predefined threshold variables related to the location.

In operation 424, the method 400 may output an updated list of people at the location based on the estimation calculated using the retrieved information and comparing the information to one or more predefined threshold variables. The method may enable the user to enter in a new destination in operation 426. If the user enters a new destination, the method 400 may proceed with the process of querying for the location and estimating the amount of people at the location in operation 402 through 424.

In operation 428, the VCS 1 may monitor for a key off event. If a key off event is not detected, the VCS 1 may continue to monitor for a new destination. If a key off event is detected, the VCS 1 may begin to power down and storing one or more congestive prediction messages in non-volatile memory while disabling one or more systems. In another embodiment, the VCS 1 may transmit one or more messages containing congestion prediction data, including an estimate for the amount of people at the location, to a connected nomadic device when a key-off event is detected.

Figure 5:
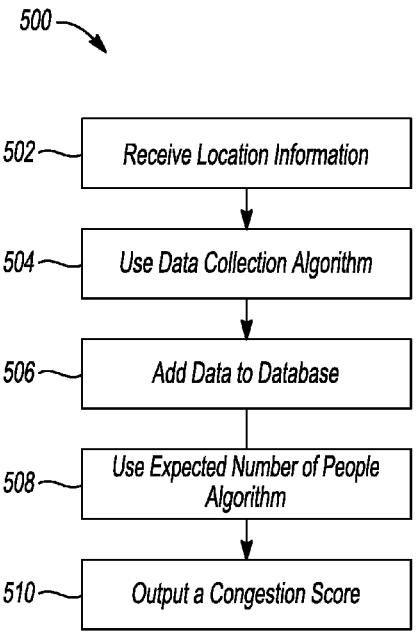
FIG. 5 is an illustrative flowchart of a congestion prediction method for the congestion prediction system.

FIG. 5 is an illustrative flowchart of a congestion prediction method 500 for the congestion prediction system. The congestive prediction method 500 may comprise of one or more software applications that are executed on hardware at the VCS, nomadic device, at the remote server, and/or a combination thereof. The one or more applications may include instructions to output a congestive prediction at the VCS and/or nomadic device based on a selected location.

In operation 502, the congestive prediction method 500 may receive location information at a display of the VCS and/or nomadic device. For example, the user may enter a vehicle and select a location such as McDonald's restaurant and/or a Target retail store at the user interface display of the telematics system. In another example, the user may enter a destination location at the user interface display of the nomadic device executing the congestive prediction application.

In operation 504, the congestive prediction method 500 may execute the data collection method 400 as described in FIG. 4 for the destination location. For example, the data collection method 400 may collect data so that a congestion prediction for the destination location may be calculated.

In operation 506, the method 500 may add the collected data for the destination location to the database. The method may compare the collected data for the destination location to data stored at the database. The method may use the comparison to improve the congestion prediction calculation for the destination.

In operation 508, the congestive prediction method may execute the expected number of people calculation method 300 as described in FIG. 3 for the destination. For example, the expected number of people calculation method may provide a model to estimate the amount of people based on the retrieval of information related to the destination.

In operation 510, the congestion prediction method 500 may output a congestion score for the destination based on the data collection method 400, the expected number of people calculation method 300, and/or a combination thereof. The congestion score may comprise of one or more indicators that may provide a visual and/or audio indication of the congestion prediction for the destination to the user. The congestion prediction method may output the congestion score for the destination at the VCS, nomadic device, and/or a combination thereof.

Figure 6:
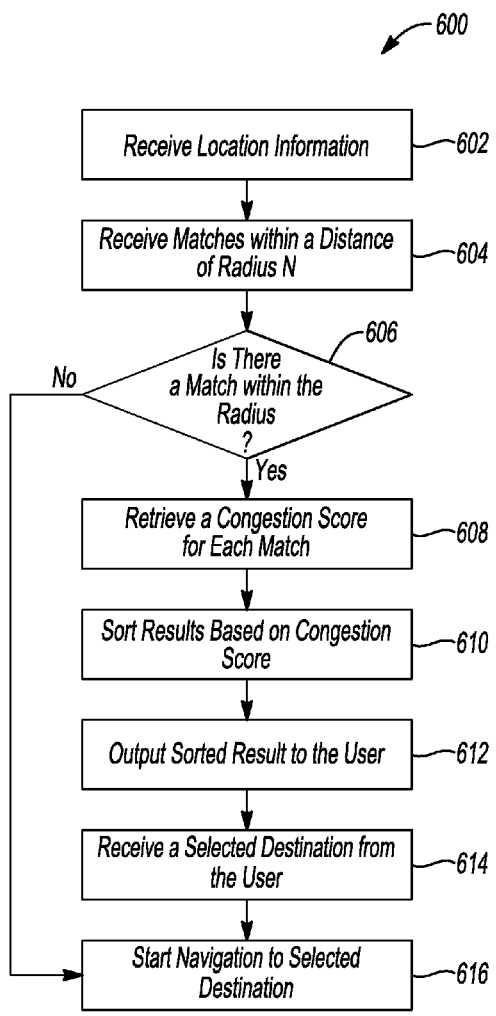
FIG. 6 is an illustrative flowchart of a navigation method using the congestion prediction system.

FIG. 6 is an illustrative flowchart of a navigation method 600 using the congestion prediction system. The navigation method 600 may comprise of one or more software application that are executed on hardware at the vehicle computing system, the VCS, the nomadic device, and/or at the remote server. The one or more applications may include instructions to provide a navigation route based on a congestion prediction for a selected destination.

In operation 602, the navigation method 600 may receive a requested destination. The method 400 may retrieve one or more matches based on the destination being located within a distance having a predefined radius to the current location of the user in operation 604.

For example, if the user enters the destination to be Starbucks®, the method 600 may retrieve one or more Starbuck locations within the predefined radius of the user's current location. The method 600 may compare the retrieved matches to the predefined radius to determine if the match is within the radius in operation 606.

In operation 608, if the one or more matches are within the predefined radius, the method may retrieve a congestion score for each match. The method may determine a congestion score for each match based on at least one of the congestion prediction method, the data collection method 400, the expected number of people calculation method 300, traffic data, historical data, and/or a combination thereof.

In operation 610, the method 600 may sort the location match results based on the congestion score associated with each destination match. For example, the low congestion location(s) may be presented to the user before presenting the locations that may have a shorter distance with higher congestion scores.

In operation 612, the method 600 may output the sorted results to one or more devices. The method 600 may receive a selected destination from the sorted results via a user interface in operation 614. In response to the selected destination, the method 600 may start a navigation route to the selected destination in operation 616.

For example, the user may have selected the destination having a lower congestion score, but may be a longer route to drive compared to the closest destination having a higher congestion score. The method may transmit the location information for the selected destination to the navigation system. The navigation system may be embedded in the VCS system. In another embodiment, the navigation system may be at the nomadic device. The nomadic device may transmit navigation system data to the VCS using wireless communication such as Bluetooth technology.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A remote server comprising:
at least one processor in communication with one or more databases having map information and attendance information, the processor configured to:
receive a current location and destination input;
query the map information for one or more coordinates for the destination within a predefined distance to the current location;
query the attendance information to estimate a number of people at the destination based on the one or more coordinates within a predefined window of time;
compare the estimated number of people to one or more predefined congestion values for the destination; and
output a congestion prediction for the destination based on the comparison.

2. The remote server of claim 1, wherein the at least one processor is further configured to transmit the congestion prediction to a vehicle computing system.

3. The remote server of claim 1, wherein the one or more databases include data that comprises at least one of historical data for the one or more coordinates, social media data, and traffic data.

4. The remote server of claim 3, wherein the historical data of the destination at the database is at least one of parking availability, average amount of people, and traffic volume.

5. The remote server of claim 1, wherein the processor is further configured to rank the one or more coordinates based on the congestion prediction and output the ranked one or more coordinates for the destination to a device.

6. The remote server of claim 1, wherein the one or more coordinates are at least one location for the destination based on the predefined distance to the current location.

7. The remote server of claim 1, wherein the destination input is at least one of a name of a business, point of interest, address, and street name.

8. The remote server of claim 1, wherein the current location is at least one of a default location, a location of a nomadic device, and a location specified by a user.

9. A method comprising:
querying map information of a database, by a processor of a remote server, for a location based on received destination input,
querying by the processor, attendance information of the database to estimate a number of people at the location within a predefined window of time, and
outputting a congestion prediction for the location based on comparing the number of people at the location to a predefined congestion value.

* * * * *